No. 859,545. PATENTED JULY 9, 1907.
P. J. COLLINS.
DYNAMO ELECTRIC MACHINE.
APPLICATION FILED DEC. 27, 1904.
2 SHEETS—SHEET 1.
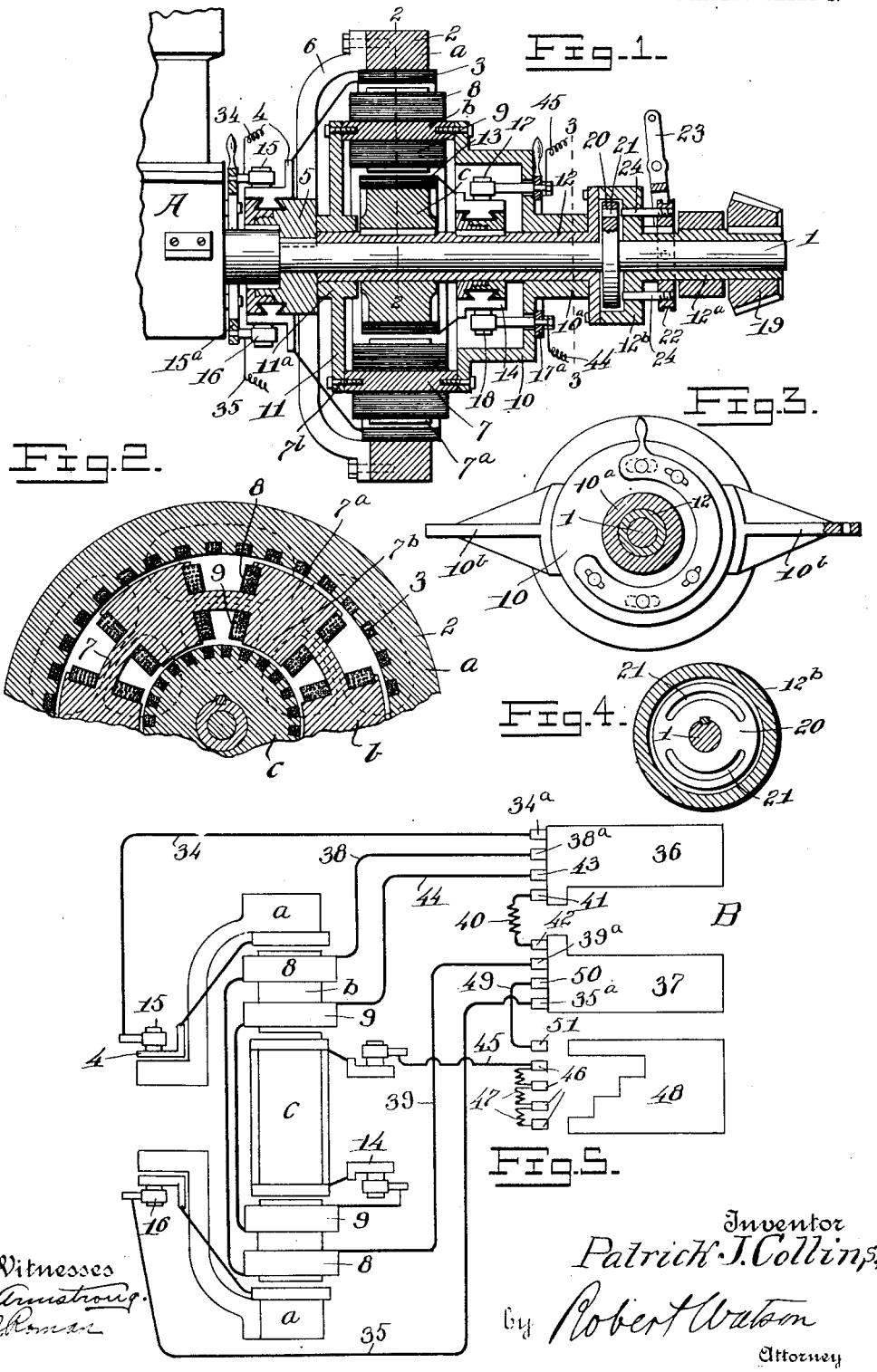
Witnesses
Inventor
Patrick J. Collins,
by Robert Watson
Attorney No. 859,545. PATENTED JULY 9, 1907.
P. J. COLLINS.
DYNAMO ELECTRIC MACHINE.
APPLICATION FILED DEC. 27, 1904.

2 SHEETS—SHEET 2.

Witnesses
L. Armstrong
J. B. Roman

Inventor
Patrick J. Collins,
by Robert Watson
Attorneys

UNITED STATES PATENT OFFICE.

PATRICK J. COLLINS, OF SCRANTON, PENNSYLVANIA, ASSIGNOR, BY MESNE ASSIGNMENTS, TO GENERAL ELECTRIC COMPANY, A CORPORATION OF NEW YORK.

DYNAMO-ELECTRIC MACHINE.

No. 859,545.   Specification of Letters Patent.   Patented July 9, 1907.

Original application filed October 12, 1904, Serial No. 228,199. Divided and this application filed December 27, 1904. Serial No. 238,431.

*To all whom it may concern:*

Be it known that I, PATRICK J. COLLINS, a citizen of the United States, residing at Scranton, in the county of Lackawanna and State of Pennsylvania, have invented certain new and useful Improvements in Dynamo-Electric Machines, of which the following is a specification.

This invention relates to improvements in dynamo electric machines especially adapted for the purposes set forth in my co-pending application, Serial No. 228,199, filed October 12th, 1904, of which this application is a division. In said original application I have shown power converting mechanism including a prime motor, an electric generator driven by said prime motor, an electric motor driven by the current from said generator and having its armature shaft connected to the load, the electric motor being variable in speed, and means for connecting the prime motor directly to the load when the driven mechanism approaches or attains its maximum speed, the main purpose of said invention being to permit the prime motor to run constantly at its normal speed in order to develop its full power, while the load may be started and operated at variable speeds by the electric motor.

The present invention relates to the dynamo electric machine adapted for the purpose stated.

Figure 6:
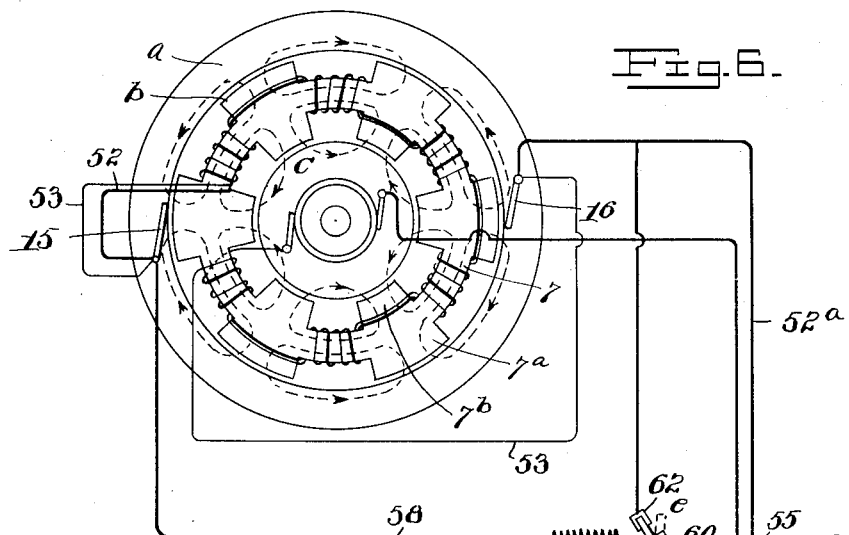
Figure 7:
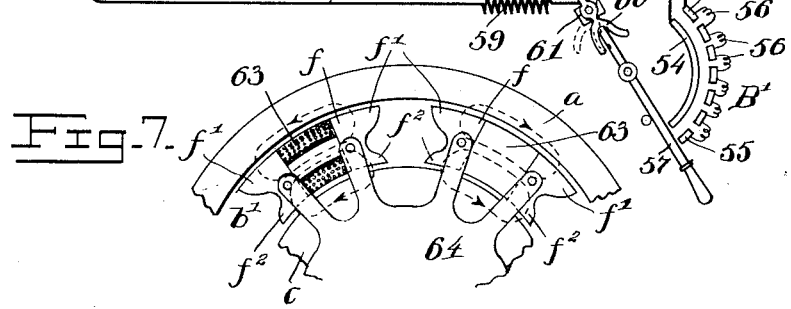
Figure 8:
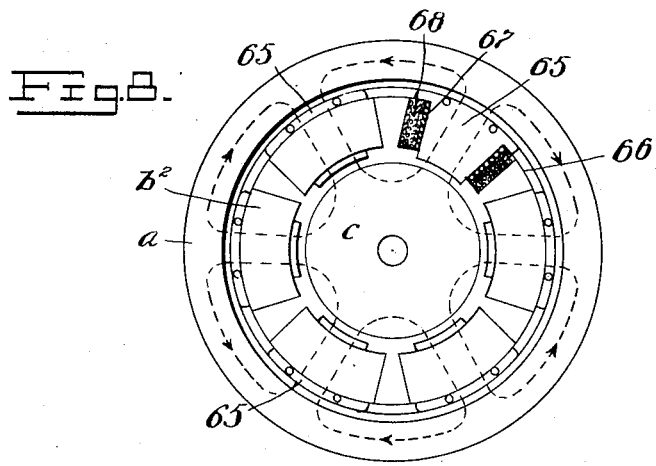

In the accompanying drawing—Figure 1 shows the dynamo electric machine in longitudinal vertical section, a portion of the prime motor being indicated in side view; Fig. 2 is a partial section on the line 2—2 of Fig. 1; Fig. 3 is a section on the line 3—3 of Fig. 1; Fig. 4 is a section showing a detail; Fig. 5 is a diagram illustrating one arrangement of circuits for the dynamo electric machine, the generator being shunt wound and the motor portion of the machine being series wound; Fig. 6 is an outline view of a similar form of dynamo electric machine in which compound windings are arranged upon the core of the intermediate member; Fig. 7 is a detail view showing a modified form of the intermediate member, and Fig. 8 shows another arrangement of the intermediate member.

Referring to Figs. 1 to 5 inclusive of the drawing A indicates an engine or prime motor which may be of any type, but usually an explosive engine which ordinarily cannot be varied in speed to correspond with desired changes in speed of the mechanism to be driven. The engine shaft 1 is extended to some distance from the engine casing and forms the main driving shaft for the apparatus.

The dynamo electric machine comprises an outer member $a$, which, as shown, is an armature having a core 2 and windings 3 connected to a commutator 4, which is mounted upon the hub 5 of a spider 6, which supports the core of the armature. The hub 5 is keyed to the driving shaft 1 so that the outer member will turn with the driving shaft. Within the outer member $a$ is arranged an intermediate member $b$, consisting, as shown in Figs. 1 and 2, of a ring-core 7, having a series of exterior polar projections $7^a$ and an interior series of polar projections $7^b$ provided with windings 8 and 9 respectively. The intermediate member is supported by a stationary frame comprising the two parts 10 and 11. These parts have central bearings $10^a$ and $11^a$ respectively, in which a tubular armature shaft 12 is journaled, and the part $10^a$ is provided with supporting brackets $10^b$. Within the intermediate member is arranged an inner member $c$, consisting of an armature which is keyed to the shaft 12 and whose windings 13 are connected to a commutator 14 upon said shaft. The intermediate member, as shown, is a double field, the outer series of poles $7^a$ co-acting with the coils of the outer member and forming a generator, while the inner series of poles $7^b$ co-act with the inner member $c$ and form a motor. The current from the outer member or armature $a$ is taken from the commutator 4 by brushes 15 and 16, supported by a rocker $15^a$, and conducted, through suitable controlling devices, to the fields of the intermediate member, and to the brushes 17 and 18, supported by a rocker $17^a$, which rest upon the commutator 14 and conduct the current to the coils of the inner member $c$.

It will be seen that when the outer member is rotated by the prime motor A, for which said member serves as a fly-wheel, the current taken from said member and admitted to the members $b$ and $c$ will cause the member $c$ to turn the tubular shaft 12. The shaft 12 has an extension $12^a$ carrying a bevel gear 19 and the two parts of the shaft 12 are provided with flanges which, when connected together, form a hollow casing $12^b$, inclosing a disk 20, which, as shown in Fig. 4, is keyed to the driving shaft. This disk is provided with arcuate slots 21, and a clutch disk 22, movable longitudinally upon the shaft 12 by means of a lever 23, is provided with pins 24 adapted to enter the slots 21. By moving the lever 23, it will be seen that the shafts 1 and 12 may be coupled together or released from one another.

When the clutch is released the engine driving shaft 1 will turn within the tubular shaft 12 without rotating the pinion 19, with which the load to be driven is connected. The engine therefore, may be rotated at a constant speed and at maximum power and the pinion 19 may be driven at a variable speed with maximum torque by the armature $c$ which derives current from the outer member $a$, the latter being constantly driven by the engine. It will thus be seen that the motor vehicle, or other mechanism, which is to be operated, may be started, while the engine is running at full speed, without jerking, and may be operated by electric power at any speed desired below the maximum speed at which it would be driven if geared directly to the engine shaft. When the tubular armature shaft 12 is brought up to a speed approaching, or equal to the speed of the driving shaft 1, the clutch may then be operated to connect the shafts 1 and 12 together and the vehicle, or other load, will then be driven directly by the engine, the motor circuits being then of course interrupted. As the electrical machine is intended mainly for starting and operating at low speeds, when used to operate automobiles, and is therefore not in constant use, it may be made of very light weight without danger of over-heating. Where it is intended to run by electrical power most of the time, of course the electrical machine will be proportioned to carry its load.

In Fig. 5 I have shown, one arrangement of circuits for the dynamo electric machine. Referring to Fig. 5, $a$, $b$, $c$ indicate the outer, intermediate and inner members respectively, and B indicates a controller. In this view the generator portion of the machine is shunt wound and the motor portion is series wound. The conductors 34 and 35 lead from the commutator 4 of the outer member to the brushes 34$^a$ and 35$^a$, which bear upon the rings 36 and 37 respectively of the controller. The field windings 8 of the intermediate member are also connected by conductors 38 and 39 to the brushes 38$^a$ and 39$^a$ bearing upon said contact rings 36 and 37 respectively. An idle resistance 40 is connected to brushes 41 and 42, which bear upon the rings 36 and 37 respectively, during the first step or movement of the controller and which leave said rings immediately after the first step. The motor circuit extends from a contact brush 43, through conductor 44, to the field coils 9 of the intermediate member, thence to the commutator 14 and through the coils of the inner member, and thence by a conductor 45 to the series of brushes 46, which are connected together by suitable resistances 47. The brushes 46 are arranged opposite a stepped segment 48 of the controller, and the first brush in the series is arranged to engage said segments on the second step or movement of the controller. The motor circuit is completed, on the second step of the controller, through a conductor 49, connecting a brush 50 on the ring 37 with a brush 51 which engages the segment 48.

It will be seen from the diagram that during the first step of the controller the generator circuits will be completed, the armature circuit of the generator being connected through the resistance 40 so that a small load will be placed upon the engine to keep the latter from racing when running idle, and that when the motor is connected to the circuit this idle resistance will be cut out. When the motor is stopped the engine is apt to race and rattle if not held down by a small load upon the armature of the generator.

In Fig. 6 I have shown in outline a similar dynamo electric machine, in which, instead of having separate field windings upon the intermediate member co-acting with the outer and inner members, I have shown a series winding 52 and a shunt winding 53, arranged upon the core 7 of the intermediate member. A compound field is thus provided for both the outer and inner members. The shunt winding 53 extends from the brush 15 to the brush 16 of the outer member, around the core of the intermediate member. The series circuit extends from the brush 15 around the core of the intermediate member, thence through the motor armature $c$, and thence to a segment 54 of a controller B'. The brush 16 is connected by a conductor 52$^a$ to a series of contacts 55 on the controller, having graduated resistances 56 between them. By means of a switch lever 57 the series circuit may be closed through the resistance 56 and the latter gradually cut out of circuit to start the motor. In order to prevent racing of the engine when the motor is stopped, a circuit 58 is connected to the brushes 15 and 16 of the generator and this circuit contains an idle resistance 59, so that a small load may be placed upon the generator when the motor is out of circuit. This circuit 58 is normally closed through an auxiliary switch $e$ when the motor circuit is interrupted, and the circuit 58 is interrupted when the lever 57 is moved to close the circuit through the motor. As shown, the switch $e$ consists of a forked lever 60, pivoted to a terminal block 61 and adapted to rest upon a terminal block 62. This forked lever, as shown, is adapted to be moved by the contact lever 57, its position when the motor circuit is interrupted, being shown in full lines, and its position when the motor is in operation being indicated in dotted lines in Fig. 6.

In Fig. 7 I have shown a modification in which, instead of having a continuous core, as in Figs. 1 and 2, the alternate core portions are omitted from the secondary member $b'$, and a series of short field core segments $f$ having field coils 63 thereon and having pole-pieces $f'$ and $f^2$ at their ends, which co-act with the outer and inner members, are supported by a pair of spiders 64, one only of the spiders being shown in the drawing.

In Fig. 8 I have shown the intermediate member $b^2$ as consisting of a series of separate wedge-shaped iron cores 65, which are arranged radially between the inner and outer members. These cores are supported by spiders bolted to the cores in the front and rear of the intermediate member, the rear spider in the drawing being indicated by the ring 66 and the front spider being omitted. The coils are wound around the bodies of the cores and the field for both the inner and outer members is produced by the same set of coils. In this instance the inner windings 67 indicate series coils and the finer windings 68 indicate shunt coils, by which a compound field, common to both armatures, is produced and the magnetic flux passes in a single path through both armatures, as indicated by the dotted lines and arrows.

Where an explosive engine is used as a prime motor, the engine may be started by admitting current to the armature coils of the outer member and the co-acting field coils of the inner member, in Figs. 1 and 2, from the battery which is ordinarily employed to provide a spark for the explosive engine. After the engine has been started the batteries may be disconnected. The engine, it will be noted, runs at its full speed before the electric machine is brought into action, and, therefore, the full power of the engine may be applied to drive the vehicle electrically from the start. The power applied to the vehicle axles, therefore, is much greater in starting than it would be if the engine were geared directly to the axles and had to start under load. As the electrical machine is not in constant use, when applied to automobiles but is mainly used to carry the vehicle from its state of rest up to its highest speed, and is then cut out of action, the iron of the machine may be worked to a much greater magnetic density than if the engine were constantly in action, and for this reason the machine may be made very light in weight.

What I claim and desire to secure by Letters Patent is:

1. In a dynamo electric machine, a generator armature, a motor armature, and an intermediate field member wound and arranged to produce a magnetic flux passing in a single path through both armatures.

2. In a dynamo electric machine, a rotatable generator armature, a rotatable motor armature, and an intermediate stationary field member wound and arranged to produce a magnetic flux passing in a single path through both armatures.

3. In a dynamo electric machine, a rotatable generator armature, a rotatable motor armature an intermediate stationary field member coacting with both of said armatures, and circuits arranged to conduct the current from the generator armature to the motor armature and to said field member.

4. In a dynamo electric machine an outer rotatable member, an inner rotatable member within said outer member, and an intermediate stationary member arranged between and coacting with said outer and inner members.

5. In a dynamo electric machine an outer rotatable member having a shaft rotatable therewith, an inner rotatable member having a tubular shaft surrounding the shaft of the outer member, and an intermediate stationary member coacting with said outer and inner members, and having end frames provided with bearings for said tubular shaft.

6. In a dynamo-electric machine, a rotatable generator element, a rotatable motor element, an intermediate stationary complementary element coöperating with both of said rotatable elements, and circuits arranged to conduct current from one of said generator elements to one of the motor elements.

In testimony whereof I affix my signature, in presence of two witnesses.

PATRICK J. COLLINS.

Witnesses:
M. C. COLLINS,
ROBT. J. MURRAY.